United States Patent
Ripplinger (10) Patent No.: US 11,250,057 B2
(45) Date of Patent: Feb. 15, 2022

(54) AUTOMATIC SELECTION OF A DATA STORE

(71) Applicant: SIEMENS AKTIENGESELLSCHAFT, Munich (DE)

(72) Inventor: Thomas Ripplinger, Karlsruhe (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 128 days.

(21) Appl. No.: 16/603,751

(22) PCT Filed: Mar. 9, 2018

(86) PCT No.: PCT/EP2018/055919
§ 371 (c)(1),
(2) Date: Oct. 8, 2019

(87) PCT Pub. No.: WO2018/188862
PCT Pub. Date: Oct. 18, 2018

(65) Prior Publication Data
US 2020/0117384 A1    Apr. 16, 2020

(30) Foreign Application Priority Data
Apr. 12, 2017 (EP) .................................. 17166208

(51) Int. Cl.
*G06F 16/901* (2019.01)
*G06F 16/907* (2019.01)
*G06F 16/185* (2019.01)

(52) U.S. Cl.
CPC .......... *G06F 16/901* (2019.01); *G06F 16/185* (2019.01); *G06F 16/907* (2019.01)

(58) Field of Classification Search
None
See application file for complete search history.

(56) References Cited

U.S. PATENT DOCUMENTS

2012/0272025 A1    10/2012  Park
2014/0229656 A1*    8/2014  Goss ....................... G06F 3/061
                                                                    711/103
2014/0372561 A1    12/2014  Hisano
(Continued)

OTHER PUBLICATIONS

Vongsingthong, Suwimon & Smanchat, Sucha, "A Review of Data Management in Internet of Things", KKU Res.j. 2015, vol. 20(2), pp. 215-240. (Year: 2015).*

(Continued)

*Primary Examiner* — Scott A. Waldron
(74) *Attorney, Agent, or Firm* — Lempia Summerfield Katz LLC (57) ABSTRACT

The disclosure relates to a method for operating a data storage system that includes a plurality of data stores. In the method, IoT data generated at a specific data point are stored in at least one data store, and at least one data store for storing the IoT data is selected automatically based on metadata, wherein the metadata are associated with a data point. The disclosure also relates to a computer program configured to carry out the method, and a data storage system that works according to the method.

9 Claims, 4 Drawing Sheets

(56) References Cited

U.S. PATENT DOCUMENTS

2015/0205818 A1   7/2015   Darcy

OTHER PUBLICATIONS

Xu, Quanqing, et al., "Building a Large-scale Object-based Active Storage Platform for Data Analytics in the Internet of Things", Springer, J. Supercomput (2016), vol. 72, pp. 2796-2814. (Year: 2016).*
Communication of the Transmission of the International Provisional Report on Patentability for corresponding PCT/EP2018/055919 dated Jun. 4, 2019.
European Search Report for European Patent Application No. 17166208.3—1871 dated Jul. 19, 2017.
PCT International Search Report and Written Opinion of International Searching Authority dated Apr. 24, 2018 corresponding to PCT International Application No. PCT/EP2018/055919 filed Mar. 9, 2018.
European Office Action for European Application No. 18 714 147.8—1213 dated Aug. 30, 2021.

* cited by examiner

AUTOMATIC SELECTION OF A DATA STORE

The present patent document is a § 371 nationalization of PCT Application Serial No. PCT/EP2018/055919, filed Mar. 9, 2018, designating the United States, which is hereby incorporated by reference, and this patent document also claims the benefit of European Patent Application No. 17166208.3, filed Apr. 12, 2017, which is also hereby incorporated by reference.

TECHNICAL FIELD

The disclosure relates to a method for the efficient storage of data from the environment of the so-called Internet of Things (IoT). The storage of data takes place in a data storage system. Furthermore, the disclosure relates to a computer program for carrying out the method and a data storage system operating according to the method.

BACKGROUND

In the Internet of Things, as is known, large data quantities are collected decentrally from distributed data sources, transferred, and centrally stored in a data storage system called hereinafter, according to the conventional terminology, a backend system and provided for further use by applications and services. The storage of the IoT data within the backend system may take place in a plurality of different data stores.

The storage of the large data quantities incurred in the Internet of Things in the backend system results in costs during ongoing operation. The longer the IoT data is stored, the greater are these quantities and the higher are the demands placed on the data preparation. Quality criteria that are essential for the data preparation are, inter alia, the so-called latency or latency time (hereinafter denoted as latency) and also the available data query functions. Latency may be understood as the temporal delay between a data query by a data consuming application and a data preparation by the lower-level technical system. Data query functions differ in the type and extent of the filter and aggregate functions that are available and their combination capabilities. The quality of the data preparation is substantially determined by the respectively used lower-level technical data stores. For example, a so-called in-memory database is distinguished by a very low latency and flexible query capabilities but is expensive. A so-called NoSQL database (NoSQL=not only SQL) or a simple file system has a higher latency and less flexible query capabilities but is associated with lower costs. Complex queries on the basis of the data values (for example, a query like "when was the rotary speed higher than 400?") is possible with NoSQL databases only after the establishment of a specific index.

In data storage systems available nowadays, a high quality of the data storage system is associated with higher costs. It is therefore not useful, as a rule, to store all the data in a common data store.

In the setting of Internet of Things systems, the IoT data to be processed may be heterogeneous and include, for example, sensor data which is stored in the form of time series data with a time signature or numerical values, process and machine events which are stored, for example, in the form of column-type data with a time signal or text, and suchlike. Further examples of IoT data to be processed are manual input, calculated KPIs (Key Performance Indicators) or so-called BLOB (Binary Large OBject) data, the latter being stored in a binary format and representing, for example, an acquired spectrum with accompanying values.

Such IoT data may be stored in different data stores and kept available there. The storage of the IoT data in a particular data store is carried out through the selection of the data store that is best suited to the IoT data. The allocation of the individual IoT data required for this to the available data stores has conventionally taken place manually and is therefore subject to the usual error sources and inaccuracies.

SUMMARY AND DESCRIPTION

The scope of the present disclosure is defined solely by the appended claims and is not affected to any degree by the statements within this summary. The present embodiments may obviate one or more of the drawbacks or limitations in the related art.

It is accordingly an object of the disclosure to provide an optimized method for the automatic operation of a data storage system (e.g., backend system) wherein in the context of the method a selection of a data store as the depositing point for incoming IoT data is made automatically.

This object is achieved by a method for operating a data storage system. In the method for operating a data storage system, the data storage system includes a plurality of data stores or a plurality of data stores belongs to the data storage system. In the method, IoT data which arises at a respective data point is automatically stored in at least one data store, an automatic selection of at least one data store takes place for storing the IoT data on the basis of metadata, and the metadata is allocated to a data point.

The advantage of the disclosure lies therein that the respective selection of at least one data store for the depositing of incoming IoT data in the data storage system takes place automatically on the basis of the respective metadata and that this is respectively allocated to a data point, that is, to the place of origin of the IoT data. Thus, for each data point and its IoT data, the respective storage location and thus also the characteristics of the data storage may be selected with fine granularity. The data storage system may automatically evaluate the metadata and on the basis thereof, select a respective data store as the depositing location for incoming IoT data.

The aforementioned object is also achieved by a data storage system (e.g., backend system) which operates according to the method described here and below and, for this, is configured to carry out the method. The method described below may be realized for the automatic implementation in the form of a computer program, possibly a distributed computer program. The disclosure also relates to a computer program with program code instructions executable by a computer, a storage medium with such a computer program, that is, a computer program product with program code, and a computer in such a system into the memory store of which is configured to carry out the method and its embodiments, such a computer program is loaded or loadable.

If method acts or sequences of method acts are described below, this relates to actions which take place on the basis of the computer program or under the control of the computer program, provided it is not expressly mentioned that individual actions are initiated by a user of the computer program. At least each use of the expression "automatic" indicates that the relevant action takes place on the basis of the computer program or under the control of the computer program.

Thus, for the avoidance of unnecessary repetition in the further description, it is the case that features and details which are described in conjunction with the method for operating the data storage system and possible embodiments, naturally also apply in conjunction with and in relation to a data storage system configured for carrying out the method and vice versa. Accordingly, the method may also be further developed by individual, or a plurality of, method claims which relate to method acts that are executed by the data storage system. In the same way, the data storage system may also be further developed with means for carrying out method acts within the context of the method. Accordingly, features and details which are described in conjunction with the method for operating the data storage system and possible embodiments, naturally also apply in conjunction with and in relation to a data storage system intended for carrying out the method and vice versa, so that with regard to the disclosure, reference is made or may be made reciprocally to the individual aspects of the disclosure.

Furthermore, with regard to an interpretation of the claims and the description on a closer concretization of a feature in a dependent claim, it is assumed that no such restriction exists in the respective preceding claims and a more general embodiment of the present method. Each reference in the description to aspects of dependent claims is thus, and without specific mention thereto, to be understood expressly as a description of optional features. Finally, it should be noted that the method set forth here may also be further developed in accordance with the dependent device claims and vice versa.

In one embodiment of the method, the metadata includes at least one metadatum regarding the specification of a latency of the IoT data arising at the respective data point. The selection of at least one data store for the depositing of the IoT data distinguished by this metadatum takes place on the basis of the metadatum, that is on the basis of the respectively provided latency. IoT data to which fast access is necessary (e.g., low latency) is thus, for example, deposited automatically by the data storage system in a different data store than IoT data to which such fast access is not necessary. It is thereby provided that the selection of the respective data store takes place according to the necessity of a later use of the IoT data. IoT data to which no particularly fast access is needed may thus automatically be deposited in a less expensive data store. Increased costs for the storage of the IoT data are only incurred where it is actually necessary.

In a particular embodiment of the method based on metadata with at least one metadatum for the specification of a latency, the selection of at least one data store does not take place directly on the basis of the metadatum. In addition, a pre-defined or pre-definable configuration of the data storage system is taken into account. This configuration includes a definition of an assignment (e.g., mapping) of a latency or a latency region to respectively at least one data store. The selection of the at least one data store therefore takes place on the basis of the configuration, for example, a configuration in the form of a lookup table or suchlike. Within the configuration, the entry which fits the latency specified in the metadatum is selected. This provides a decoupling of the actual specification in the respective metadatum. By adapting the configuration, for example, an available, fast but as yet little used, data store may also be offered and used for such IoT data which after the required latency specified by the metadatum may also be stored in a less fast data store. By the configuration and the allocation included thereby, in the automatic selection of a data store, the behavior and the capability of the overall system may be taken into account and the configuration may be dynamically adapted thereto, for example if, in the process of a change of the data storage system, a new, as yet unused data store is added.

In a further embodiment of the method, the data activity is also taken into account, that is, the frequency with which IoT data deposited in a data store is accessed. For this purpose, the data storage system uses, in place of a latency specified by a metadatum, an adaptable latency value that is initialized with a latency defined in the metadata. On accessing the IoT data of a data point, in the context of a data activity recognition, the data storage system monitors the exceeding of a configurable activity threshold. On exceeding the activity threshold, the adaptable latency value is reduced by a configurable amount. The latency of often used IoT data is thus adapted independently of the user. In the case of a frequent use, the adaptable latency value falls and the automatic selection of the at least one data store is carried out by the data storage system on the basis of the adaptable latency value. Often used IoT data may thus arrive in another (e.g., faster) data store than was provided originally according to the metadata. This enables a dynamic adaptation of the automatic selection of the storage location carried out by the data storage system. Optionally, exactly as the adaptable latency value is reduced with often used IoT data, this may be increased with seldom used IoT data by a configurable amount. The relevant IoT data may thus also arrive in another (e.g., slower) data store than was provided originally according to the metadata. As a result, lower costs are incurred for the less often used IoT data.

In a further embodiment of the method, the IoT data of a data point is automatically stored with an increased failure prevention depending upon a criticality defined in the metadata, for example, with single or multiple redundancy and/or at spatially different storage locations.

Additionally, or alternatively, in one embodiment of the method, it is provided that the IoT data of a data point is automatically deleted after the expiry of a lifetime defined in the metadata. Such IoT data then incur no further costs following their automatic deletion.

In a special embodiment of the method, the IoT data of a data point for which, by the metadata an indexing has been requested, is automatically deposited in a data store suitable therefor. Optionally, in conjunction with the depositing of the IoT data, an index is created relating to the IoT data in the data store selected as suitable.

Finally, in one embodiment of the method, it is optionally provided that, in the event of a size limit of a data store, a latency defined in the metadata is used for determining a priority and that, on the basis of the priority determined, the IoT data is automatically deposited in a faster data store or in a data store which is slower in comparison therewith. This prevents an "overflow" of a size-limited data store in that, on the basis of the priority, at least one further data store is also used. IoT data with a higher priority continues to enter the size-limited data store although now on the basis of the avoidance capability in the form of the at least one further data store, it may be used for longer.

The advantage of the disclosure therefore lies, in particular, therein that the users of an IoT system may exert fine-grained influence on the quality of the storage of the IoT data of individual data points, in particular, with regard to a latency, an indexing and a lifetime of the IoT data. By the approach set out herein, it is provided that the latency in the requesting of the data of a data point may be lastingly guaranteed. Indices are established only when needed, specifically after specification by the user responsible for the data and without an administrator intervention or suchlike.

BRIEF DESCRIPTION OF THE DRAWINGS

Exemplary embodiments of the disclosure will now be described in greater detail making reference to the drawings. Objects or elements which correspond to one another are provided with the same reference signs in all the drawings.

The exemplary embodiments are not to be understood as a restriction of the disclosure. Rather, in the context of the present disclosure, enhancements and modifications are certainly possible, in particular, those which for a person skilled in the art are derivable, for example, by combination or modification of individual features or method acts in conjunction with those described in the general or special description part and in the claims and/or the drawings, with regard to the solution of the problem and by combinable features, lead to a new subject matter or new method acts or method act sequences.

In the drawings.

DETAILED DESCRIPTION

Figure 1:
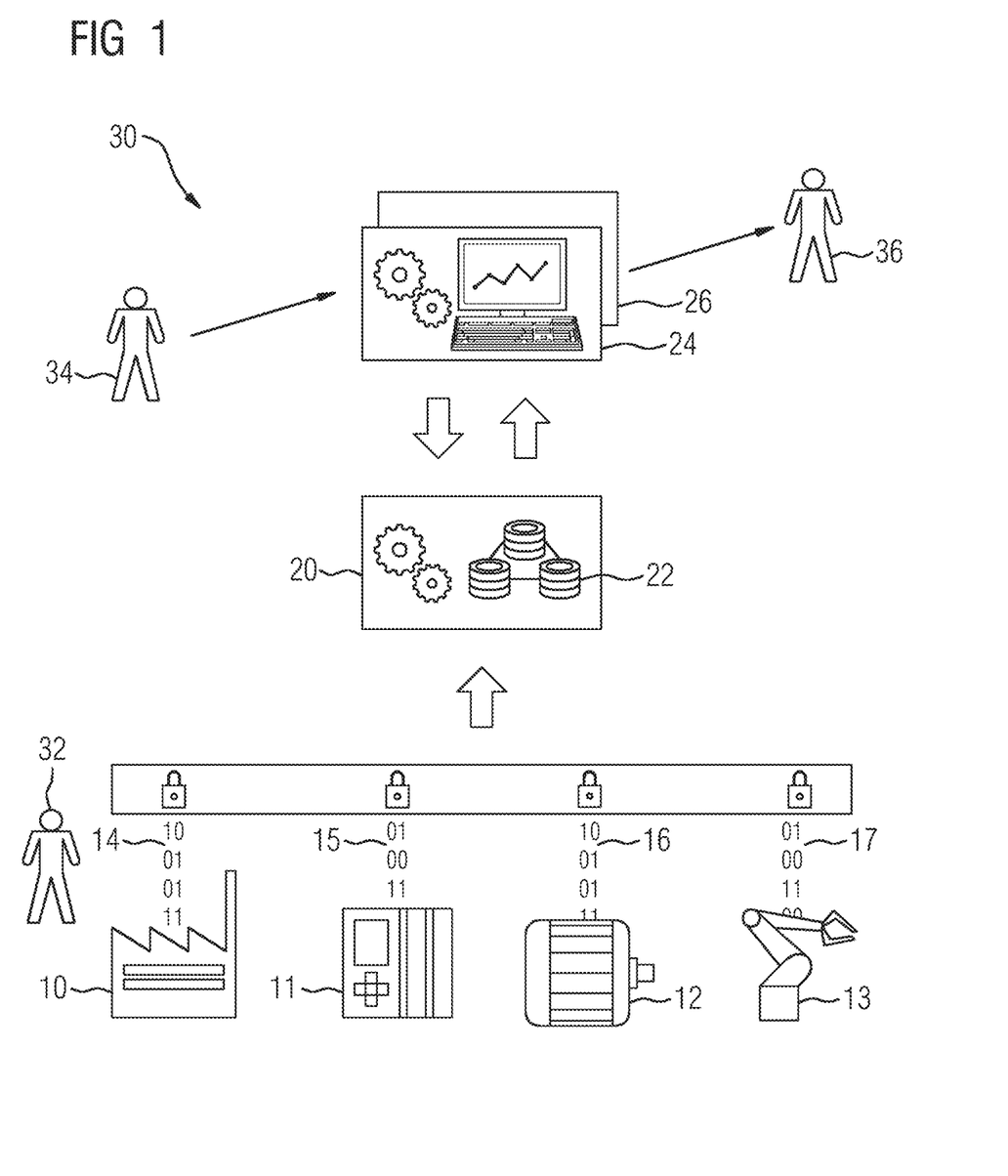
FIG. 1 depicts an example of an IoT scenario with IoT data to be acquired and stored in a backend system.

The representation in FIG. 1 depicts an example of an IoT (Internet of Things) scenario. IoT data 14, 15, 16, 17 arising from widely varying data sources 10-13, also identified hereinafter, inter alia, as data points 10, 11, 12, 13 is transferred (optionally encrypted) to a backend system 20 and deposited in a data store 22 included by the backend system 20. The backend system 20 is, for example, a computer (e.g., server) reachable within the so-called cloud or a computer network reachable within the cloud.

By a defined user or programming interface (e.g., Application Programming Interface or API), access to the stored IoT data 14-17 is possible. This takes place by individual or a plurality of applications 24 or services 26.

The data sources 10-13, the backend system 20 and the or each data store 22 included thereby and the or each application 24 intended for access to the stored IoT data 14-17 and/or the or each service 26 intended for access to the stored IoT data 14-17 are hereinafter denoted the IoT system 30.

The following persons or groups of persons may influence an IoT system 30: a person or organization 32 that initially configures the acquisition of the IoT data 14-17 and for this purpose is familiar with the properties of the respective data source or data sources 10-13; a person or organization 34 that offers services 26 for data utilization, for example, by creating and providing a software implementation of a service 26; or a person or organization 36 that uses such a service 26 or such services 26 for access to the stored IoT data 14-17.

In the interests of better legibility but without sacrificing a wider-reaching general applicability, the description is continued on the basis of the following simplifications: in place of a person or organization 32, 34, 36, reference is made to a user 32, 34, 36, specifically a first user 32, a second user 34 and a third user 36. The second user 34 creates the or each service 26 for access to the IoT data 14-17 and uses and/or creates at least one application 24 for this, by which an access to the stored IoT data 14-17 is also possible. The third user 36 uses a service 26 or a service 26 from a plurality of available services 26 for access to the stored IoT data 14-17.

Such applications 24 or services 26 are carried out, for example, on the backend system 20 and are reachable there in a fundamentally known manner, for example, by a device (e.g., computer with browser, smartphone, or suchlike) used by the respective user 32, 34, 36. Alternatively, such applications 24 or services 26 are executed on a device of the aforementioned type used by the respective user 32-36 and the respective device creates a data connection to the backend system 20 in a manner that is per se known in principle and exchanges the data arising in the context of the operating actions of the user 32-36 with the backend system 20.

Conventionally, the allocation of the IoT data 14-17 in an IoT system 30 to a data store 22 takes place, for example, on the basis of a respective age of the IoT data 14-17 (data age). This is based on the assumption that new and thus current IoT data 14-17 may be more relevant than older IoT data 14-17. New IoT data 14-17 is therefore held in a fast, more expensive data store 22 and after expiry of a predetermined or predeterminable time duration, is moved into a slower, more cost-efficient data store 22. Associated with this allocation on the basis of the data age is, for example, the problem of a high latency on access to older IoT data 14-17 and the partial occupancy of the fast data store 22 is associated with actually less relevant IoT data 14-17. Accordingly, given an activity-based allocation according to data age, the statically configured allocation described above is combined with an automatic recognition of active IoT data 14-17. Long inactive (e.g., unused) IoT data 14-17 is thereby automatically removed to a more economical data store 22. Associated with this, however, is the problem that on access to seldom needed IoT data 14-17, an unforeseeable latency arises, and no solution is provided for the problem of the long-term data depositing. In the case of an activity-based allocation according to the data age, the method of data processing known as "caching" may be used. Herein, often and/or recently used IoT data 14-17 is held in a special fast storage region. Access to a lower-level, slow storage system may thus thereby be partially avoided. Example problems with the use of caching are, inter alia, the restricted size of the so-called cache memory, providing the consistency of a cache and the lower-level storage system and an unforeseeable latency on access to specific IoT data 14-17, because its presence in the cache may not be guaranteed. Caching is helpful only to a limited extent in the IoT environment, because the use of the cache is not controllable by all the users of the IoT system 30 and only a maximum of two data stores are distinguished.

Where here and hereinafter, "expensive" or "economical"/"more economical" data stores 22 are mentioned, this relates not only in part to their acquisition price, but rather also to the costs for using a data store 22 during ongoing operation. Such costs are in part accounted for as a type of rent. Specifically, the speed of the data store 22 is included in the calculation of the use of the fees to be charged. Accordingly, the use of storage in a fast data store 22 is more expensive than the use of storage in a relatively slow data store 22.

In the solution proposed here for the allocation of the IoT data 14-17 to a respective data store 22, the use of metadata 40 (FIG. 2) is provided. Thereafter, each IoT data source (e.g., data point) 10-13 is enhanced with metadata 40 for allocation of the IoT data 14-17 arising at the respective data source 10-13 to a respective data store 22.

Figure 2:
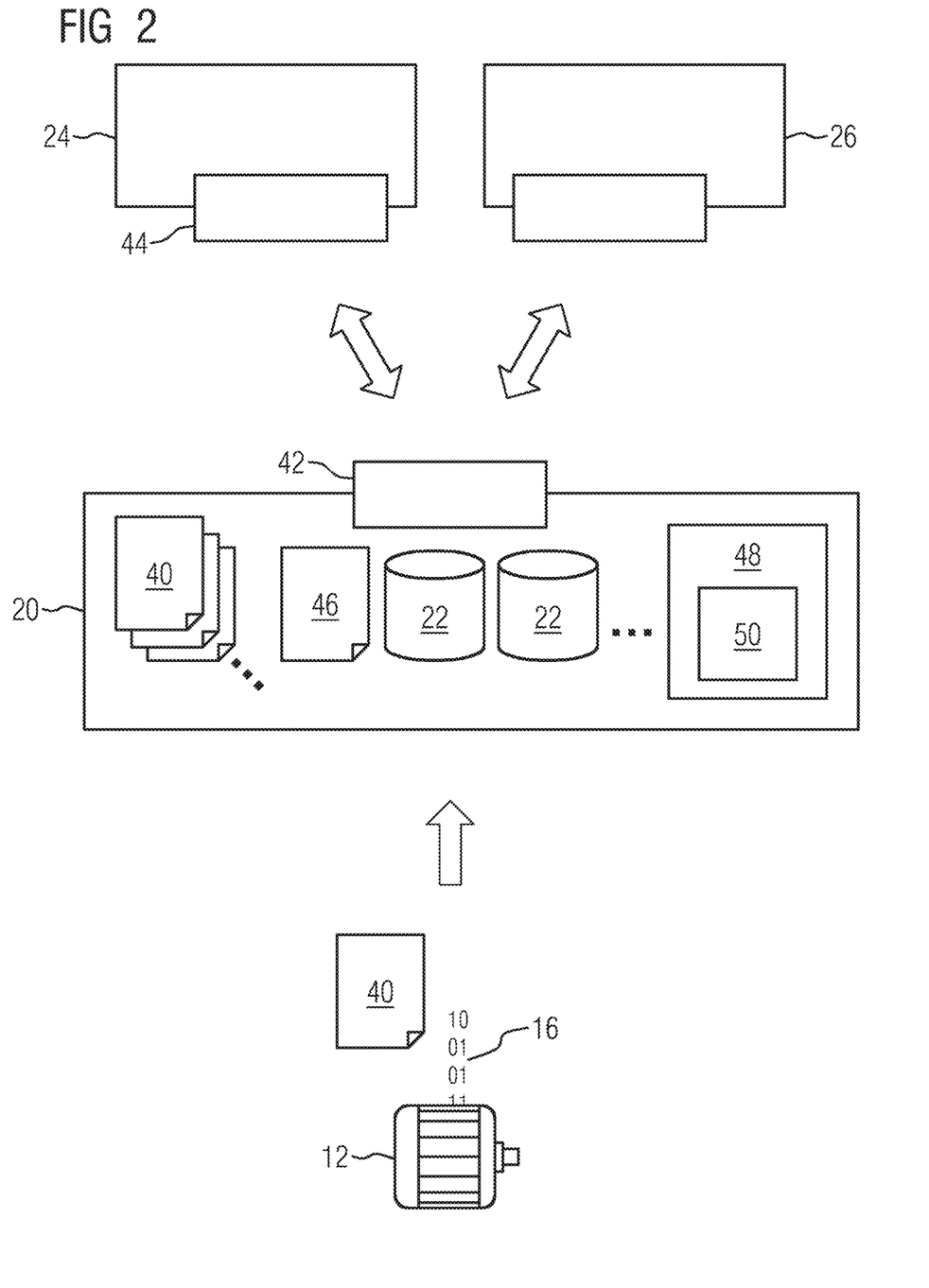
FIG. 2 depicts an example of a backend system with further details.

By the metadata 40, it is specified, inter alia, which planned latency the data point 10-13 may have (low to high), whether an indexing is required for the data point 10-13 (yes or no) in order to support complex queries on the basis of the IoT data 14-17 during operation, and/or which planned lifetime may apply for the data point 10-13 (short to long or number of days).

Furthermore, it may optionally also be provided that it is specified by the metadata 40 what planned criticality is to apply for the data point 10-13 (low to high). Where appropriate, according to the desired access capability, further metadata 40 may be defined. Metadata 40 (where useful) is given on a scale (e.g., 1 to 100, where 1 means, for example, "lowest possible latency").

Shown in FIG. 2 by way of example is one of the data sources 10-13 of FIG. 1. The data source 12 shown is an electric motor. The IoT data 16 from the electric motor stems from at least one sensor (not shown) or suchlike associated with the electric motor. Each sensor is a data source/data point 12 of the electric motor. In the case of a plurality of sensors, a plurality of data points 10-13 belong to the electric motor. For the better intelligibility of the following description, it is continued (without loss of a wider-reaching general applicability) using the example of a data point 12 for the electric motor. A plurality of data points 12 for the electric motor and, in general, a plurality of data points 10-13 for each individual data source 10-13 is also to be understood in each case.

The initial establishment of the metadata 40 of a data point 10-13 takes place in conjunction with the configuration of the data acquisition, that is, for example, the establishment and configuration of the data points 10-13 by the first user 32. The configuration may take place at the respective data source 10-13. The resulting metadata 40 of a respective data point 10-13 may be sent individually or together with the IoT data 14-17 of the data point 10-13 to the backend system 20. Alternatively, the configuration of the metadata 40 of a data point 10-13 may also be undertaken directly on the backend system 20. In both cases, the future administration of the respective IoT data 14-17 is specified in advance and the metadata 40 is stored at the backend system 20 and is available there for evaluation and processing.

Optionally, an advance setting of the metadata 40 of a data point 10-13 may come about from existing domain knowledge or may be derived from overlaid engineering systems. Domain knowledge is, for example, information regarding the operational and data properties of a machine functioning as a data source 10-13 or suchlike or of a machine type, etc. For example, in the case of a rotary speed monitor of an electric motor, rotary speed measurement values are acquired more often than, for example, with a temperature sensor which acquires the ambient temperature. From this there result different data quantities, but also different necessary latencies. In order, for example, to be able to recognize rapidly a pattern of the rotary speed of the electric motor, an access to recently acquired older measurement values are also possible. Due, however, to a normally only slowly changing ambient temperature, higher latencies are permissible for recognizing a change in the temperature pattern.

Furthermore, the metadata 40 of a data point 10-13 may also be specified and/or adapted during the operation of the IoT system 30 by the second user 34. This takes place by a system interface 42 on and for the backend system 20. In this way, for example, if needed a latency originally planned in the metadata 40 of a data point 10-13 may be reduced and transferred into an actually effective latency. Also, for example, a lifetime originally defined in the metadata 40 of a data point 10-13 may be increased retrospectively and/or an indexing may be requested retrospectively. Such influencing capabilities are optionally limited in a manner that is in principle known and are then embedded in an authorization classification. For the implementation of such influencing capabilities, an application 24 used by the second user 34 includes at least one interface 44 for access to the stored IoT data 14-17 and the metadata 40. An adaptation of the metadata 40 of a data point 10-13 takes place, for example, by the calling of an interface function, for example, an interface function such as "SetDatapointLatency (datapoint, newLatency)" whereby datapoint denotes the data point 10-13 and newLatency is the new latency specified by the call of the interface function. Below, metadata 40 is sometimes referred to only briefly for simplification. Metadata 40 is associated with exactly one data point 10-13. Every mention of metadata 40 is therefore also to be understood as meaning that the metadata 40 involves exactly one data point 10-13 in each case.

For the effective perception of such influencing capabilities and for the optimum setting of the metadata 40, the second user 34 has domain knowledge available. Furthermore, the second user 34 may grant to the third user 36, for example, in the context of a service 26 used later for access to the IoT data 14-17, setting capabilities for individual data points 10-13 or classes of data points 10-13. These setting capabilities are passed on by the application 24, via the system interface 42 mentioned, to the backend system 20. This allows the establishment or adaptation of metadata 40 to the respective data point 10-13 or the respective data points 10-13.

The backend system 20 is intended and configured to take account automatically of the metadata 40 in the allocation of the IoT data 14-17 obtained in each case by a data source/a data point 10-13. A data point 10-13 or a plurality of data points may belong to a data source 10-13. In certain examples, exactly one data point 10-13 belongs to a sensor as the data source 10-13, specifically a data point 10-13 at which the IoT data 14-17 supplied by the respective sensor, for example, temperature data arises. In certain examples, a plurality of data points 10-13 belongs to an industrial robot as the data source 10-13, specifically for example, a data point 10-13 at which IoT data 14-17 arises which represents the current configuration of the industrial robot, a data point 10-13 at which IoT data 14-17 arises, which represents status messages or suchlike of the industrial robot and/or a processing of a workpiece by the industrial robot, and so on.

IoT data 14-17 which originates from a data point 10-13 to which a low required latency has been assigned by the metadata 40 is deposited in the region of the backend system 20 in a fast data store 22. In brief, it may also be said that by the metadata 40, the data point 10-13 itself is or will be allocated to such a fast data store 22. Accordingly, IoT data 14-17 which originates from a data point 10-13 to which a high latency has been assigned by the metadata 40 is deposited in a data store 22 that is slower as compared with the fast data store 22. Accordingly, it may here be so formulated that by the metadata 40, such a data point 10-13 is or will be allocated to a slower data store 22.

The exact allocation of the IoT data 14-17 or of the respective data point 10-13 to exactly one data store 22 takes place by the backend system 20. For this purpose, the backend system 20 accesses a specified or specifiable configuration 46 denoted in the following as a backend system configuration 46. The backend system configuration 46 defines, in the manner of a look-up table or suchlike, an assignment of the latencies respectively defined in the metadata 40 to at least one data store 22. Thus, a decoupling of the metadata 40 from the storage system included by or reachable by the backend system 20 and from the or each associated data store 22 is achieved.

If individual data stores 22 have a size restriction, the backend system 20 optionally automatically uses the latency defined in the metadata 40 in order to determine a priority. Then, on the basis of the priority, it is decided which IoT data 14-17 is deposited in a faster data store 22 and which IoT data 14-17 is placed, to protect the resources of the faster data store 22, in a data store 22 that is slower as compared therewith.

The IoT data 14-17 of a data point 10-13 for which, by the metadata 40, an indexing has been requested, is automatically deposited by the backend system 20 in a data store 22 suitable therefor. In addition, when needed, an index is generated for the IoT data 14-17 of the data point 10-13 to enable more complex data queries later.

Older IoT data 14-17 is automatically deleted by the backend system 20 after expiry of the respective lifetime defined by the metadata 40.

Optionally, the IoT data 14-17 of a data point 10-13 may be stored automatically by the backend system 20 with increased failure prevention, according to a criticality defined in the metadata 40, that is, deposited, for example, simultaneously in a plurality of data stores 22. In this respect, for example, it comes into consideration that the backend system 20 automatically stores the IoT data 14-17 of a data point 10-13, to which by the metadata 40 a high criticality has been assigned, with triple redundancy, in spatially separate data stores 22. The respective assignment of a criticality and failure prevention defined in the metadata 40 to a respective storage schema and/or the data store 22 to be used according to a storage schema is, for example, also defined in the backend system configuration 46. This also decouples a configuration undertaken in the metadata 40 from the storage system included by or reachable by the backend system 20 and from the or each associated data store 22.

Furthermore, the IoT data 14-17 of a data point 10-13 may optionally automatically be displaced by the backend system 20 on the basis of a metadatum "ageing" after reaching the ageing number into a next slower data store 22 in order to optimize operating cost.

The automatic depositing of IoT data 14-17 of a data point 10-13 on the basis of its metadata 40 by the backend system 20 into at least one data store 22 included or reachable thereby may optionally be combined with a method that is in principle per se known for automatic data activity recognition. With this, the actually effective latency may be improved, if it may occur that a latency originally defined in the metadata 40 is unfavorable or unsuitable. If, for example, a high latency has been assigned to a data point 10-13 by the metadata 40 and the IoT data 14-17 thereof is actually often queried by a service 26, a lower latency than the originally defined latency is useful. On exceeding a pre-defined activity threshold, the originally defined latency is adapted by the backend system 20. The adaptation takes place, for example, in that in place of the originally defined latency, an adaptable latency value is used. This is initialized with the originally defined latency and reduced by a configurable amount on exceeding the activity threshold.

Figure 3:
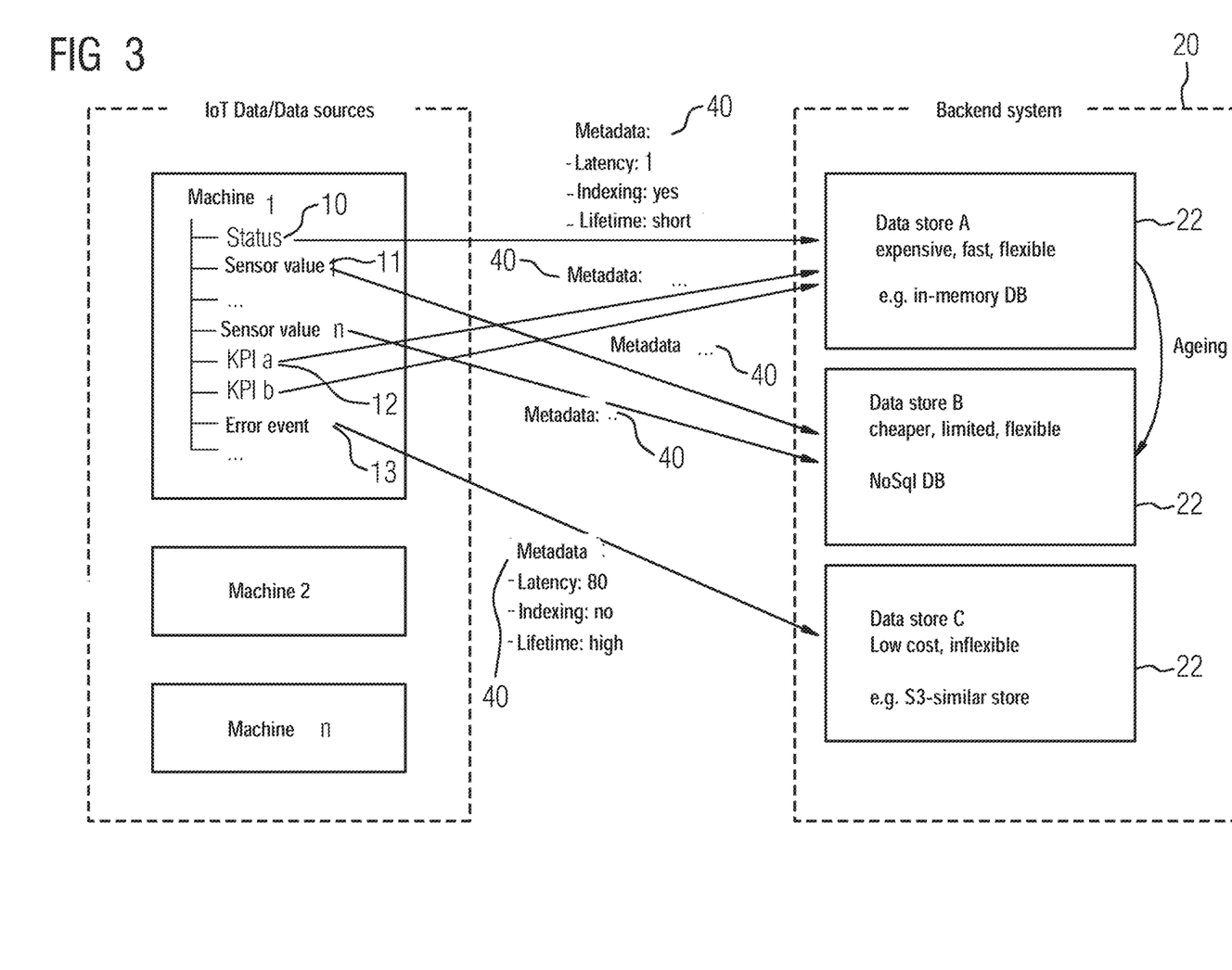
FIG. 3 and FIG. 4 depict examples of a graphical illustration of a selection of a data store of the backend system as a storage location for IoT data.
Figure 4:
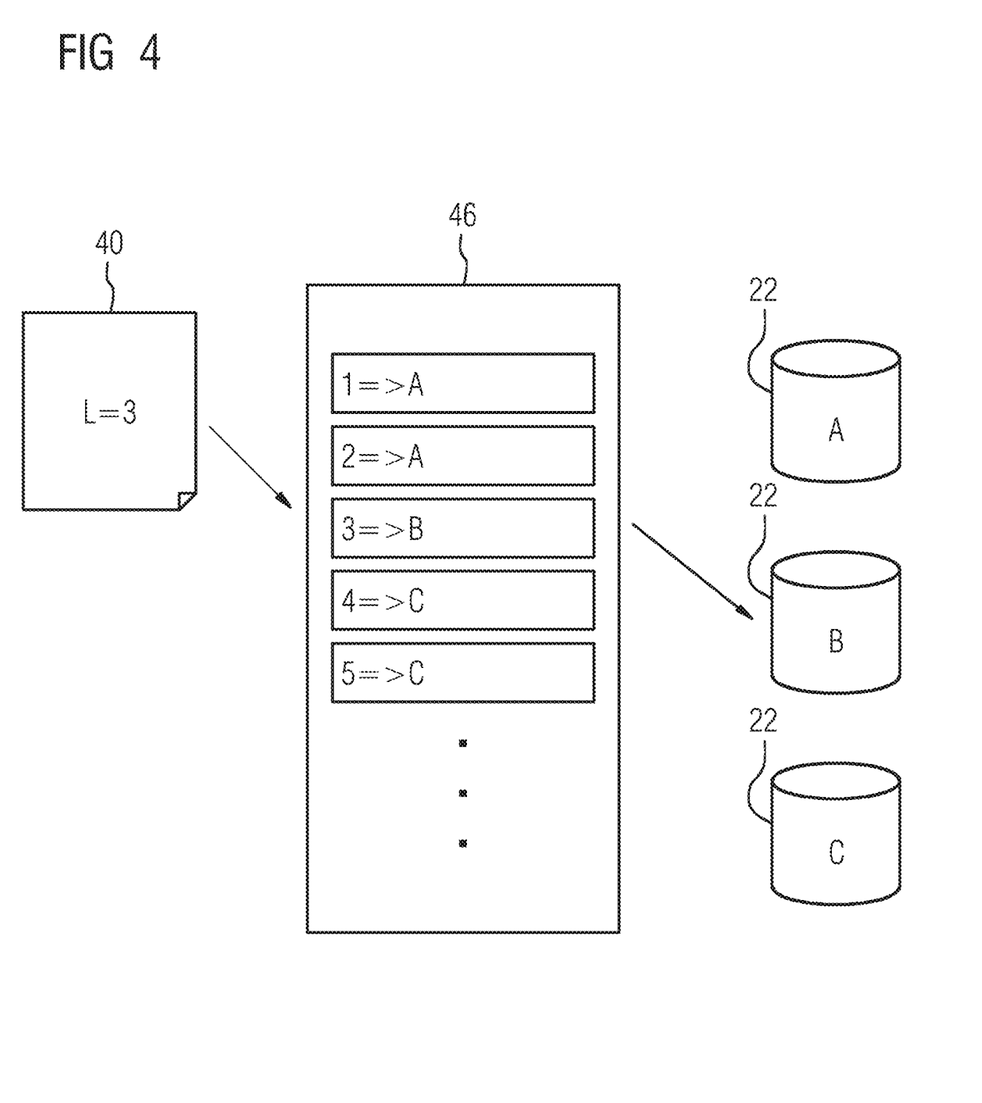

The representations in FIGS. 3 and 4 show, for further illustration, individual aspects of the statement above in a graphical form. The representation in FIG. 4 shows that the IoT data 14-17 illustrated in the form of the arrows extending from left to right pass from the individual data points 10-13 dependent upon the respective metadata 40 into individual data stores 22 of the backend system 20. The representation in FIG. 4 shows the influence of the backend system configuration 46. In a use of such a backend system configuration 46 that is, in principle, optional, the metadata 40 does not directly specify the respective data store 22. This concrete specification takes place in the backend system configuration 46. In the example shown in FIG. 4, the metadata 40 includes a metadatum that defines a latency ("L=3"). The backend system configuration 46 includes an assignment, in the form of a look-up table or suchlike, of a latency value or a latency value range to a data store 22. In the representation in FIG. 4, the data store 22 included by the backend system 20 is identified symbolically as "A", "B" and "C". The backend system configuration 46 includes, for the latency defined in the metadata 40, an allocation to exactly one data store 22 ("3=>B"). The metadata 40 together with the backend system configuration 46 thus specify that the IoT data 14-17 of the data point 10-13 distinguished with this metadata 40 passes into the data store 22 identified symbolically as "B". This applies accordingly for the metadata 40 of other data points 10-13.

The carrying out of the method described above, specifically the storage, dependent upon the metadata 40 allocated to a data point 10-13, of the IoT data 14-17 of the respective data point 10-13 by the backend system 20 and in the region of the backend system 20 takes place by and under the control of a control unit 48 (FIG. 2) of the backend system 20. This involves, for example, a computer that is in principle known with a storage unit and a processing unit in the form of or in the manner of a microprocessor. Loaded into the storage unit is a computer program 50 functioning as a backend system control program 50 (FIG. 2) which is carried out on operation of the backend system 20. The backend system control program 50 includes computer program instructions for carrying out the depositing, as described above, dependent upon metadata 40, of IoT data 14-17 in at least one data store 22 in each case.

The data storage system 20 herein denoted the backend system 20 is advantageously, but not necessarily, located in the so-called cloud and is accordingly reachable via the Internet. The or each data store 22 used by the data storage system 20 may be allocated locally to the data storage system 20 or may itself be reachable via the Internet.

Although the disclosure has been illustrated and described in detail with the exemplary embodiments, the disclosure is not restricted by the examples given and other variations may be derived therefrom by a person skilled in the art without departing from the protective scope of the disclosure. It is therefore intended that the foregoing description be regarded as illustrative rather than limiting, and that it be understood that all equivalents and/or combinations of embodiments are intended to be included in this description.

Individual significant aspects of the description set forth here may thus be briefly summarized as follows: what is disclosed is a method for operating a data storage system 20 including a plurality of data stores 22, whereby in the context of the method, IoT data 14-17 which arises at a respective data point 10-13 is stored in at least one data store 22, whereby an automatic selection of at least one data store 22 for storage of the IoT data 14-17 takes place on the basis of metadata 40 and whereby the metadata 40 is allocated to a data point 10-13, and a computer program 50 with an implementation of the method and a data storage system 20 operating according to the method.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method for operating a data storage system comprising a plurality of data stores, the method comprising:
providing Internet of Things (IoT) data, wherein the IoT data arises at a plurality of data points;
supplementing, by a processor of the data storage system, each data point of the plurality of data points with metadata for assigning the IoT data to a data storage, wherein the metadata comprises at least one metadatum for specification of a latency of the IoT data arising at the respective data point, wherein an adaptable latency value is initialized with the latency defined in the at least one metadatum, wherein, on accessing the IoT data of a data point of the plurality of data points in a context of a data activity recognition, an exceeding of a configurable activity threshold is monitored, and wherein, on exceeding the activity threshold, the adaptable latency value is reduced by a configurable amount;
automatically selecting at least one data store of a plurality of data stores for storage of the IoT data based on the adaptable latency value of the at least one metadatum allocated to a respective data point of the plurality of data points; and
storing IoT data in the selected at least one data store of the plurality of data stores.

2. The method of claim 1, wherein the automatic selection of the at least one data store takes place based on the at least one metadatum and a configuration of the data storage system, and
wherein the configuration comprises a definition of an assignment of the latency or a latency region to respectively at least one data store.

3. The method of claim 1, wherein the IoT data of a data point of the plurality of data points is automatically stored according to a criticality defined in the metadata with increased failure prevention.

4. The method of claim 1, wherein the IoT data of a data point of the plurality of data points is automatically stored after expiry of a lifetime defined in the metadata.

5. The method of claim 1, wherein the IoT data of a data point of the plurality of data points for which an indexing has been requested, by the metadata, is automatically deposited in a suitable data store.

6. The method of claim 1, wherein, in event of a size limit of a data store of the plurality of data stores, a latency defined in the metadata is used for determining a priority, and
wherein, based on the priority determined, the IoT data is automatically deposited in a faster data store or in a data store which is slower in comparison therewith.

7. A non-transitory storage medium storing computer-executable program code instructions, wherein the program code instructions, when executed, cause a processor of a data storage system to:
provide Internet of Things (IoT) data, wherein the IoT data arises at a plurality of data points;
supplement each data point of the plurality of data points with metadata for assigning the IoT data to a data storage, wherein the metadata comprises at least one metadatum for specification of a latency of the IoT data arising at the respective data point, wherein an adaptable latency value is initialized with the latency defined in the at least one metadatum, wherein, on accessing the IoT data of a data point of the plurality of data points in a context of a data activity recognition, an exceeding of a configurable activity threshold is monitored, and wherein, on exceeding the activity threshold, the adaptable latency value is reduced by a configurable amount;
automatically select at least one data store of a plurality of data stores for storage of the IoT data based on the adaptable latency value of the at least one metadatum allocated to a respective data point of the plurality of data points; and
store Internet of Things (IoT) data in the selected at least one data store.

8. A data storage system comprising:
a plurality of data stores;
a processor;
a storage unit; and
a computer program,
wherein the computer program is loaded into the storage unit and, on operation of the data storage system by the processor, is configured to:
provide Internet of Things (IoT) data, wherein the IoT data arises at a plurality of data points;
supplement each data point of the plurality of data points with metadata for assigning the IoT data to a data storage, wherein the metadata comprises at least one metadatum for specification of a latency of the IoT data arising at the respective data point, wherein an adaptable latency value is initialized with the latency defined in the at least one metadatum, wherein, on accessing the IoT data of a data point of the plurality of data points in a context of a data activity recognition, an exceeding of a configurable activity threshold is monitored, and wherein, on exceeding the activity threshold, the adaptable latency value is reduced by a configurable amount;
automatically select at least one data store of a plurality of data stores for storage of the IoT data based on the adaptable latency value of the at least one metadatum allocated to a respective data point of the plurality of data points; and
store Internet of Things (IoT) data in the selected at least one data store.

9. The data storage system of claim 8, wherein the automatic selection of the at least one data store is configured to take place based on the at least one metadatum and a configuration of the data storage system, and
wherein the configuration comprises a definition of an assignment of the latency or a latency region to respectively at least one data store.

* * * * *